United States Patent [19]

Artusy

[11] 4,279,240
[45] Jul. 21, 1981

[54] SELF-REGULATING SOLAR WINDOW DEVICE

[76] Inventor: Bobby L. Artusy, P.O. Box 1161, Newark, Del. 19711

[21] Appl. No.: 100,101

[22] Filed: Dec. 4, 1979

[51] Int. Cl.³ .............................................. F24J 3/02
[52] U.S. Cl. ................................. 126/419; 126/432; 160/6; 49/25
[58] Field of Search ................. 126/419, 422, 438; 49/25, 64; 160/5, 6, 107

[56] References Cited

U.S. PATENT DOCUMENTS

| | | |
|---|---|---|
| 2,595,905 | 5/1952 | Telkes . |
| 3,022,549 | 2/1962 | Cummings ............................ 160/107 |
| 3,675,023 | 7/1972 | Kunke et al. ......................... 250/83.3 |
| 3,860,055 | 1/1975 | Wild ......................................... 160/1 |
| 3,863,621 | 2/1975 | Schoenfelder . |
| 3,884,414 | 5/1975 | Baer . |
| 3,952,947 | 4/1976 | Saunders . |
| 3,971,359 | 7/1976 | Bourne . |
| 3,987,786 | 10/1976 | Keyes et al. ........................... 126/400 |
| 3,990,635 | 11/1976 | Restle et al. . |
| 4,051,999 | 10/1977 | Granger et al. . |
| 4,064,867 | 12/1977 | Schlesinger . |
| 4,072,142 | 2/1978 | Lof . |
| 4,078,544 | 3/1978 | Hollands et al. . |
| 4,085,999 | 4/1978 | Chahroudi ............................. 350/1.1 |
| 4,086,909 | 5/1978 | Lyon et al. . |
| 4,106,483 | 8/1978 | Barber . |
| 4,111,359 | 9/1978 | Trombe et al. . |
| 4,114,593 | 9/1978 | Guertin . |
| 4,117,831 | 10/1978 | Bansal et al. . |
| 4,121,565 | 10/1978 | Grisbrook . |
| 4,132,220 | 1/1979 | Thomason . |

Primary Examiner—Carroll B. Dority, Jr.
Attorney, Agent, or Firm—Finnegan, Henderson, Farabow and Garrett

[57] ABSTRACT

A window device for controlling the transmission of solar radiation therethrough, having a first diffuser means forming the exterior of the device for diffusing incoming solar radiation, a second diffuser means spaced interiorly from the first diffuser means for further diffusing the incoming solar radiation, a plurality of substantially planar vanes situated between the first and second diffuser means, with each of the vanes having reflective surfaces and being pivotal about an axis passing through its center of gravity, the vanes being interconnected to move substantially in unison, means for automatically controlling the inclination of the vanes about their respective axes in response to the amount of solar radiation transmitted past the vanes, a plurality of substantially planar insulating panels spaced interiorly from the second diffuser means, with each of the panels being pivotable about an axis passing through its center of gravity and being interconnected to move substantially in unison, and means for automatically controlling the inclination of the panels about their respective axes in response to the amount of solar radiation transmitted past the vanes, whereby the amount of solar radiation transmitted through the window is controlled. Also, active and passive solar collection systems employing such a window device.

28 Claims, 13 Drawing Figures

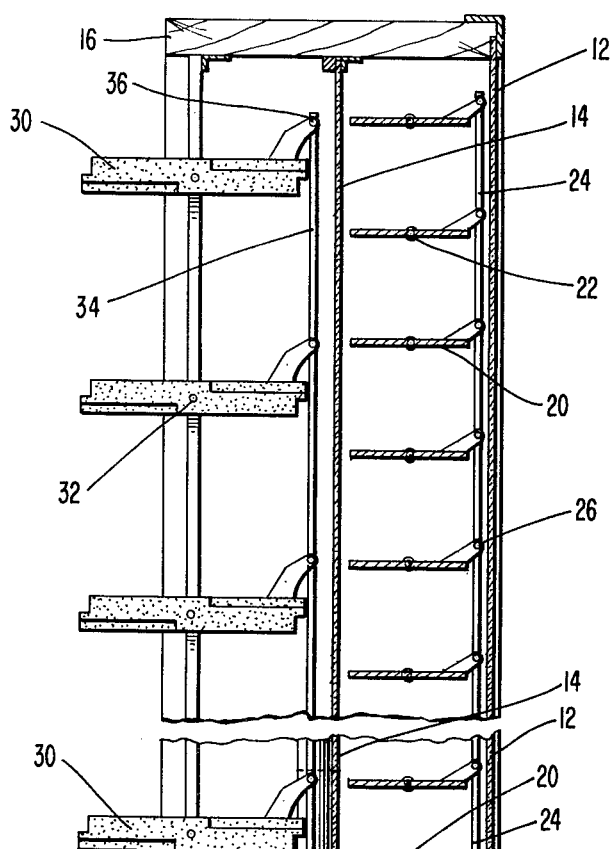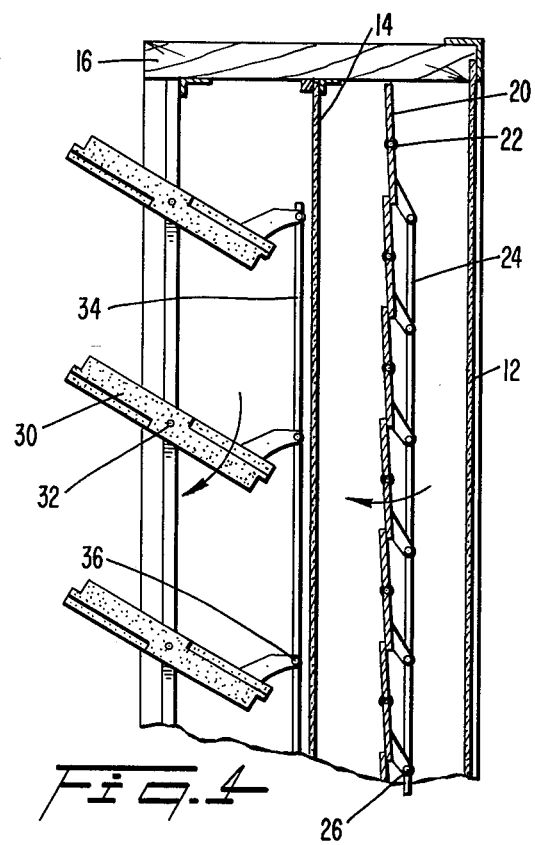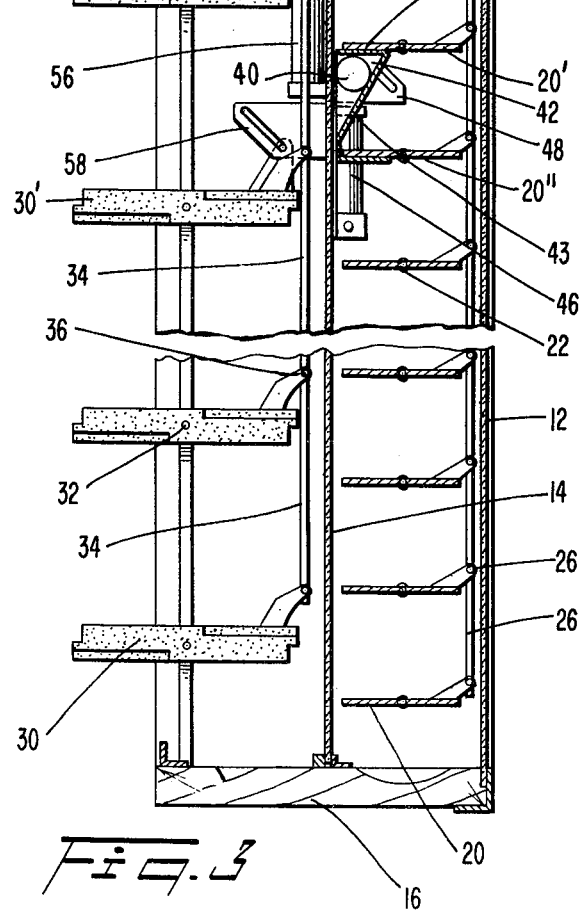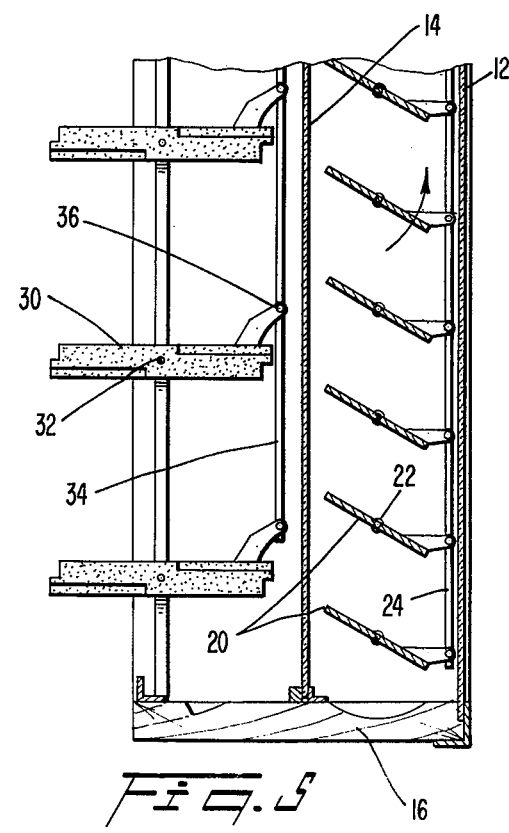
Fig. 3  Fig. 4  Fig. 5

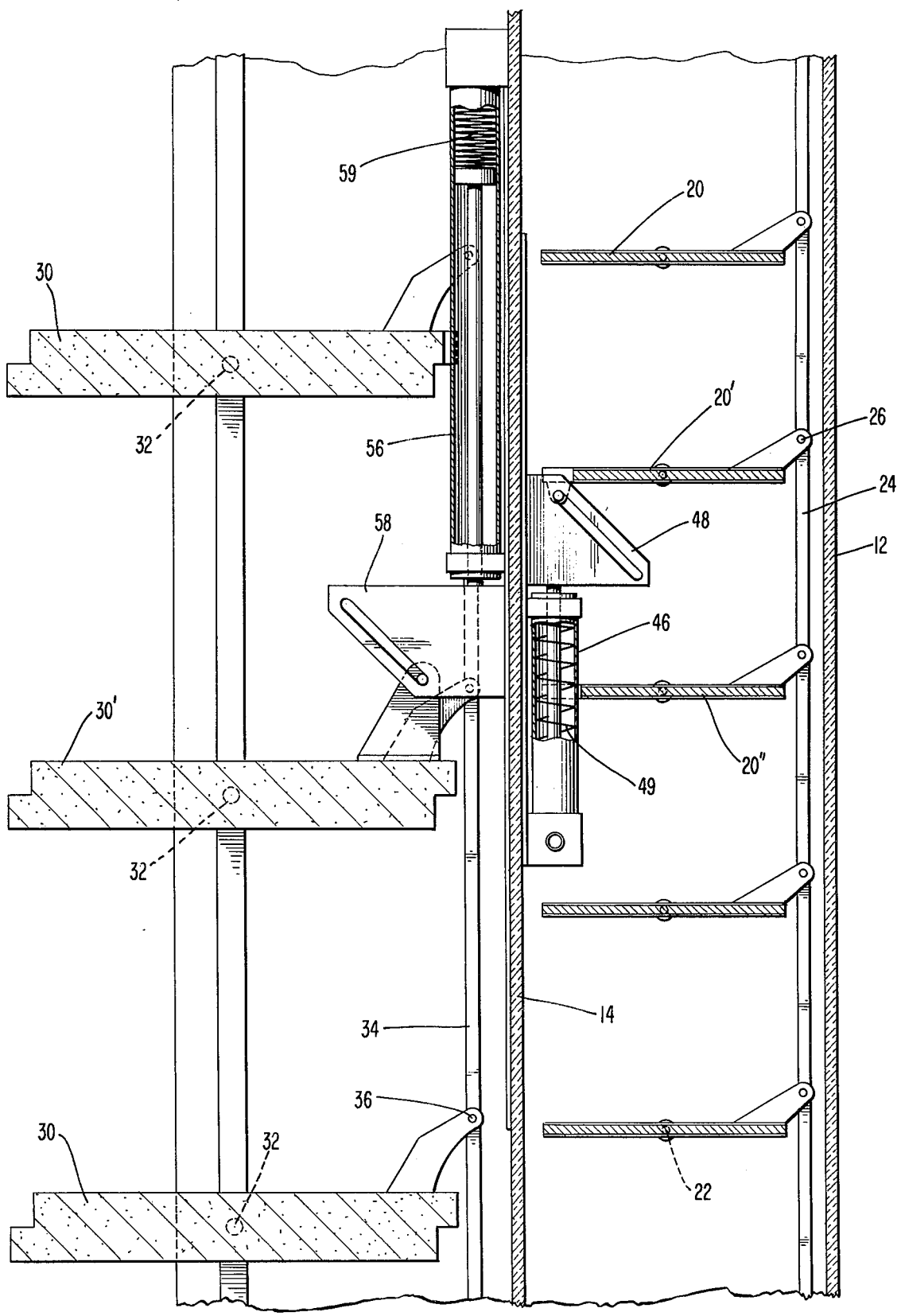

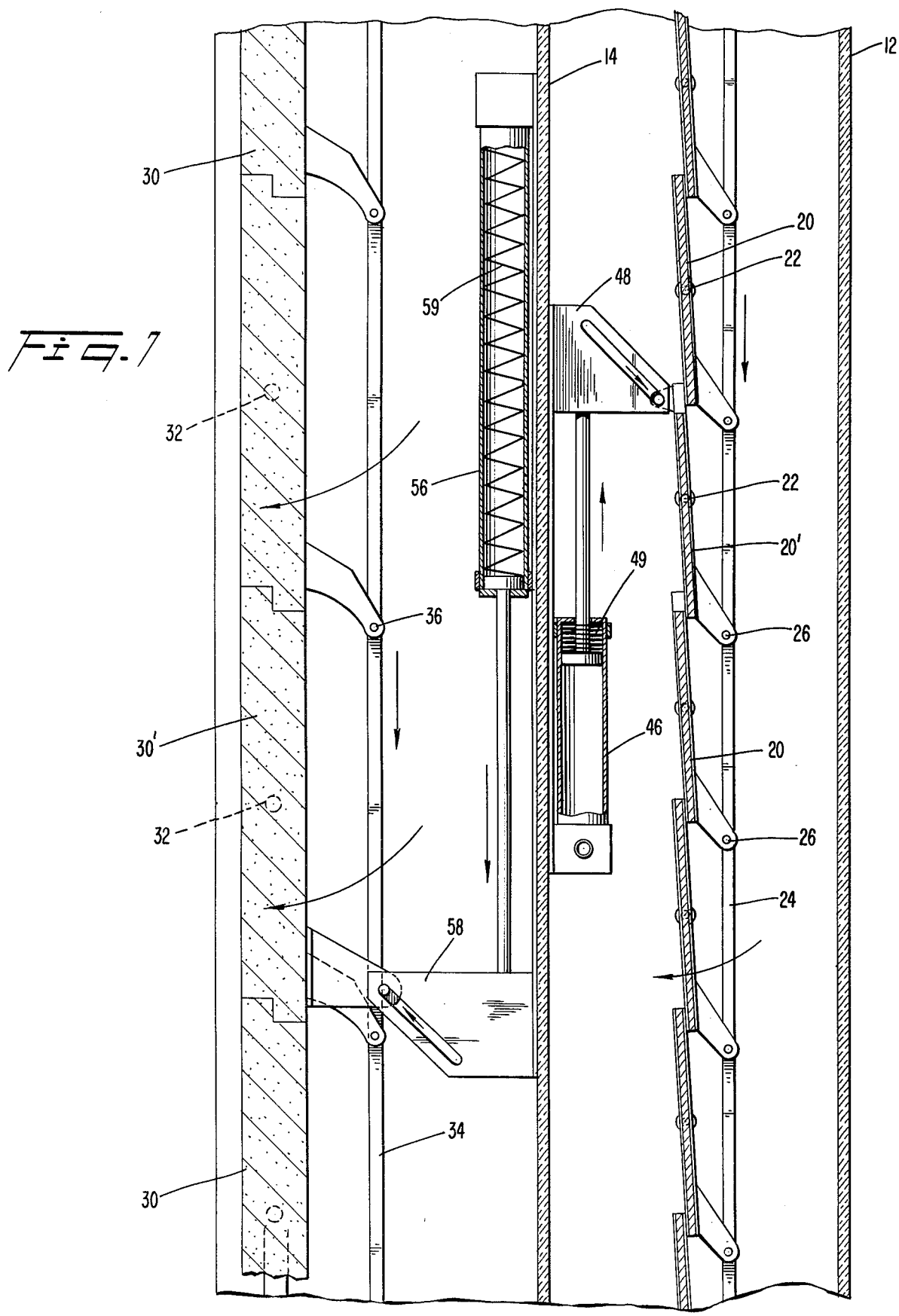

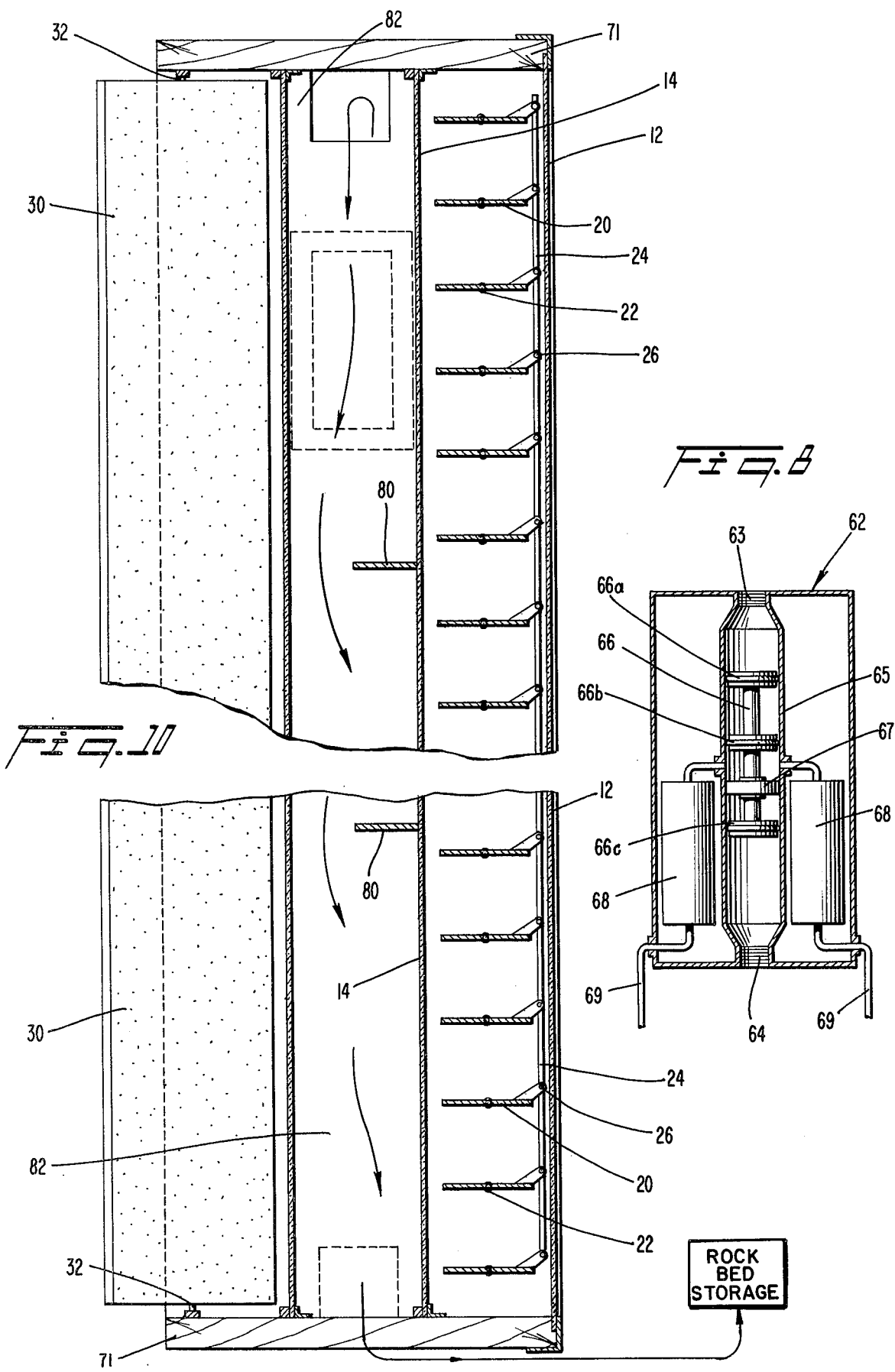

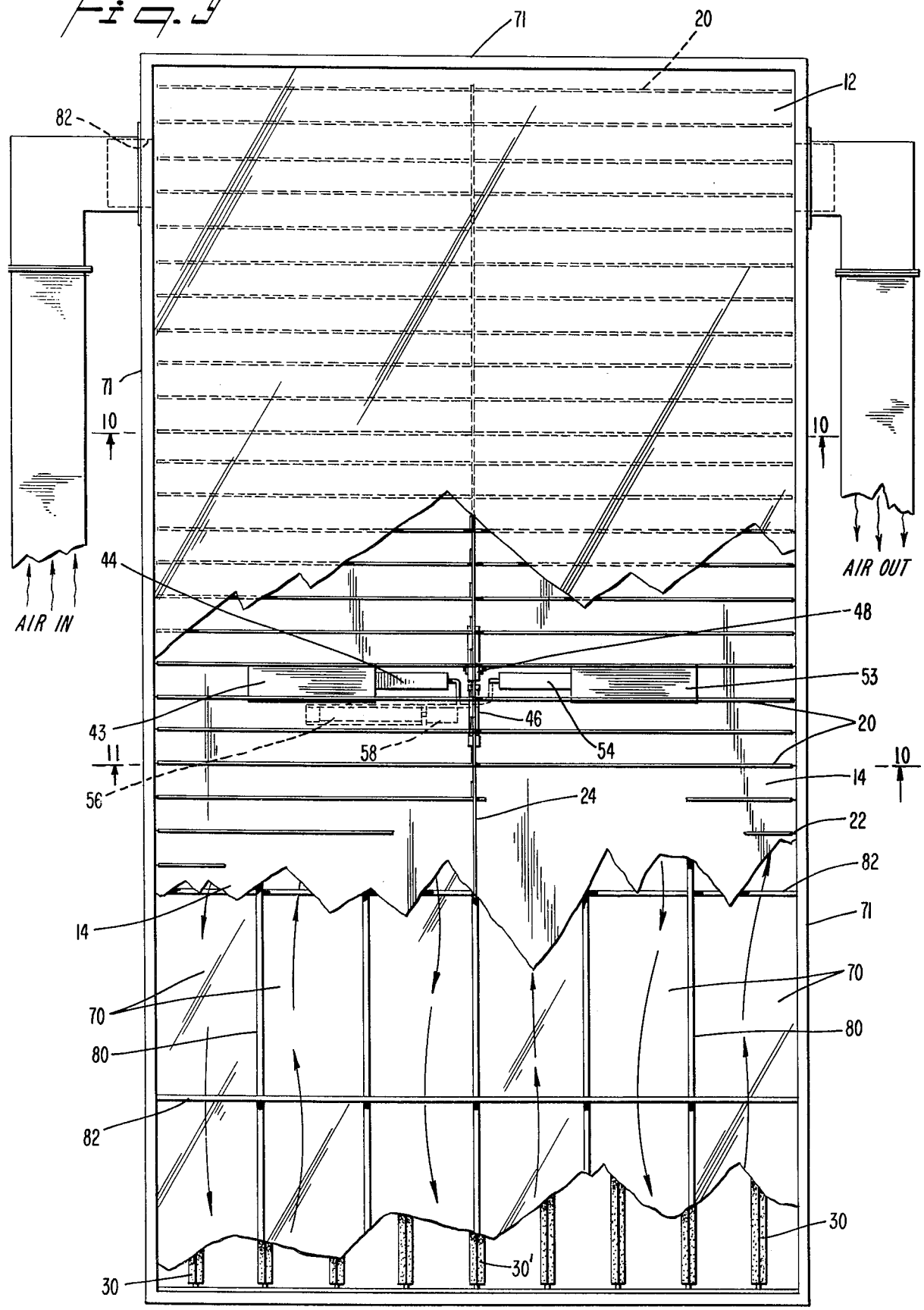

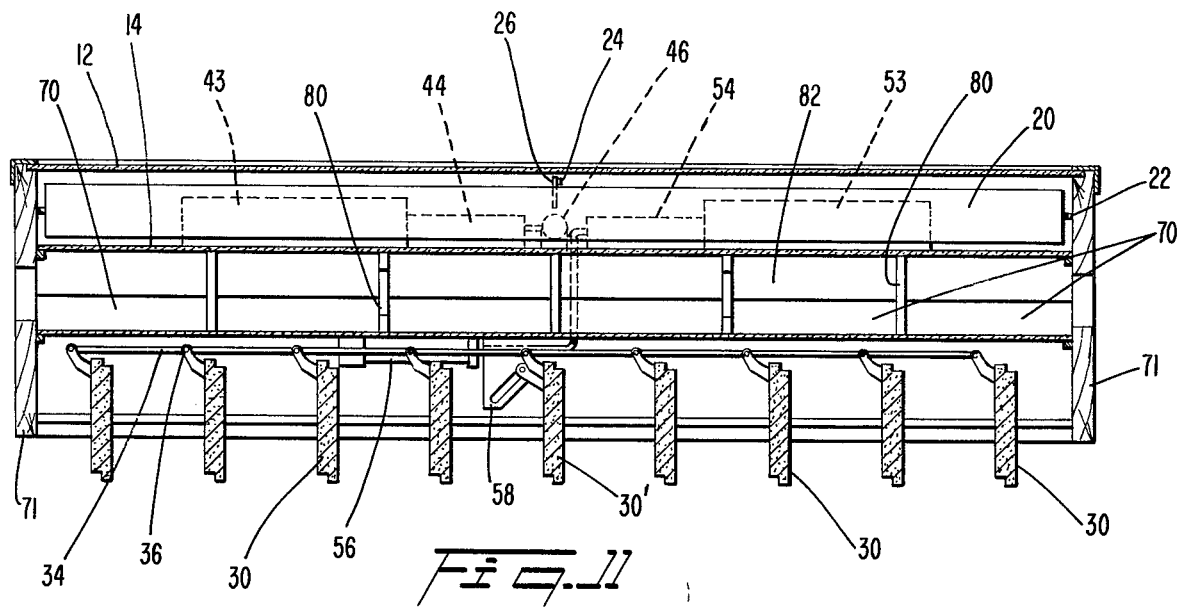
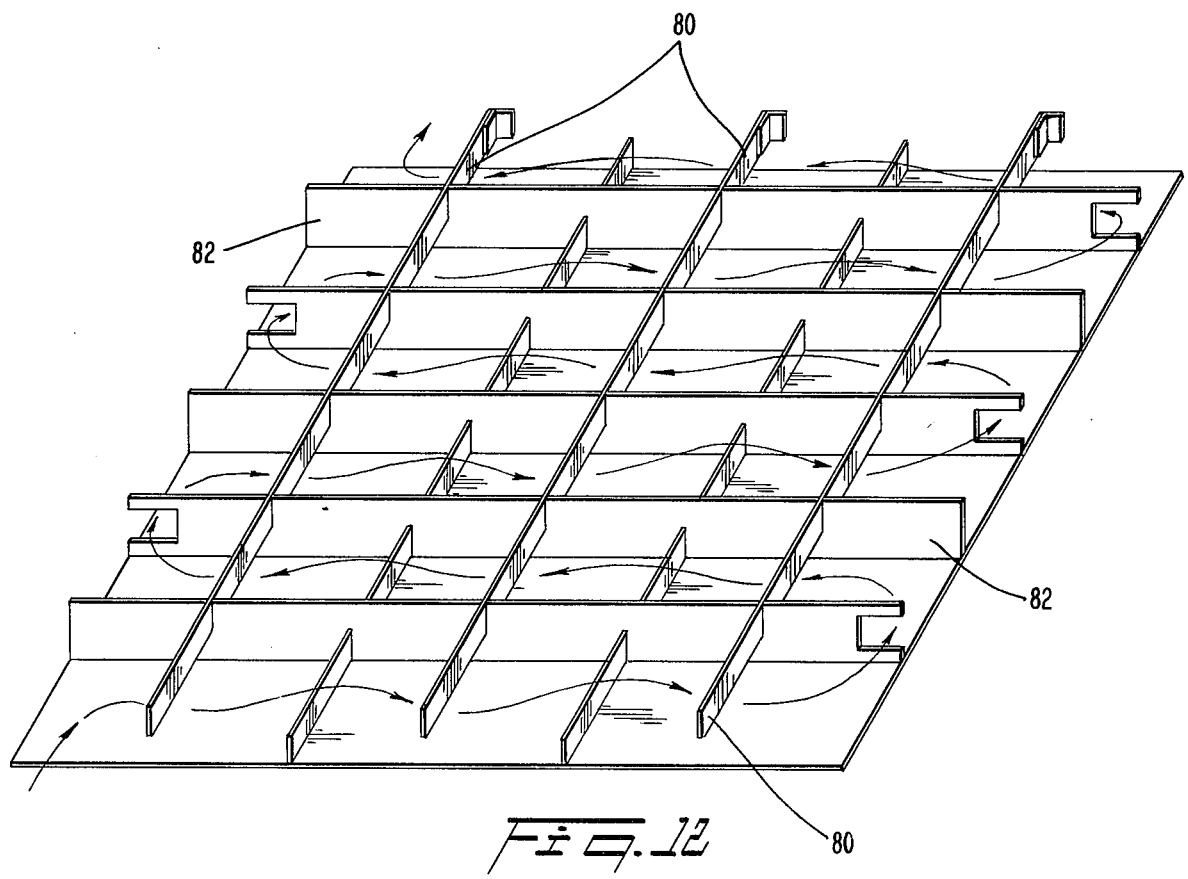

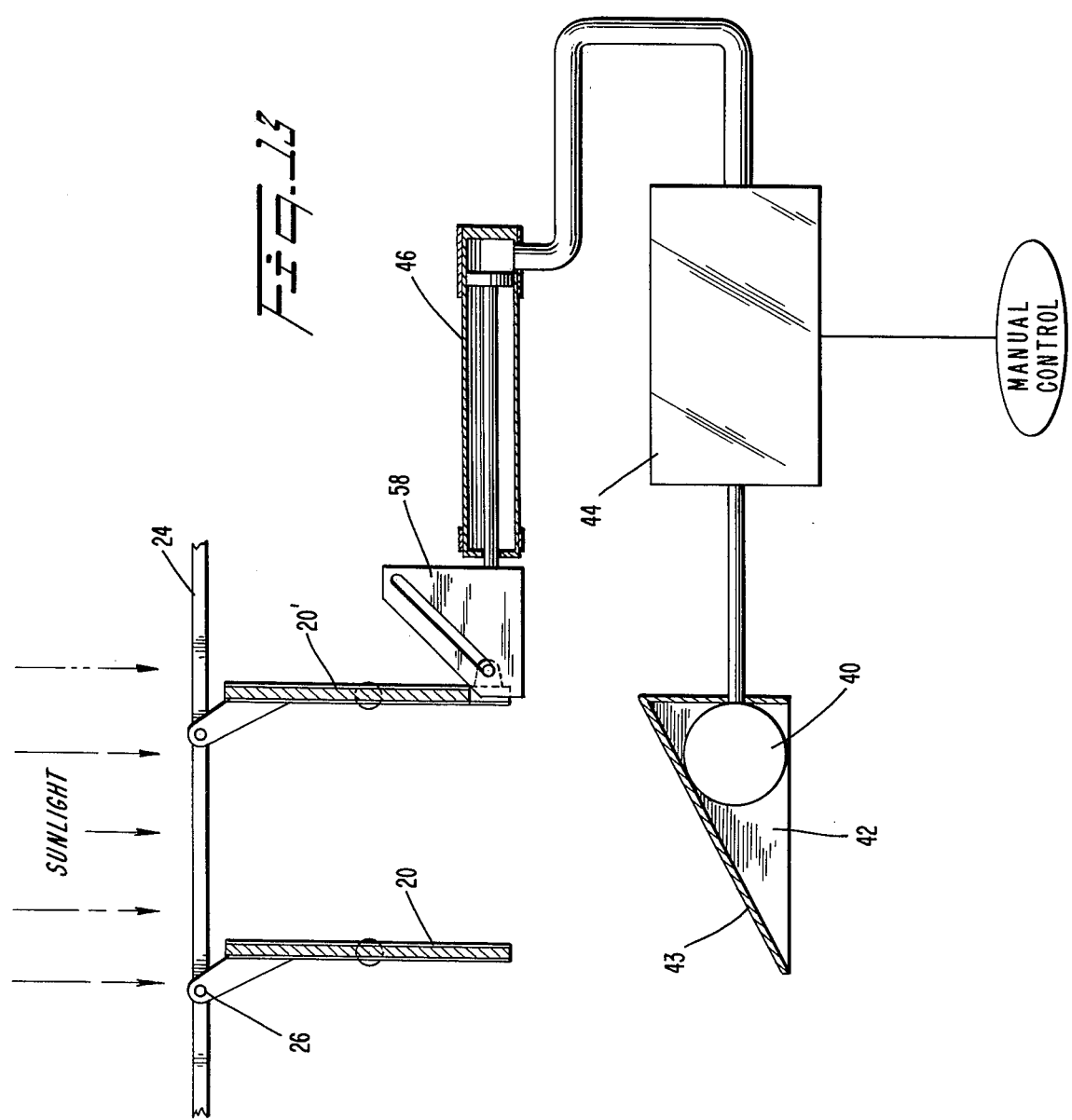

SELF-REGULATING SOLAR WINDOW DEVICE

BACKGROUND OF THE INVENTION

The present invention rlates to a self-regulating solar window device for controlling the transmission of solar radiation to an area, and to active and passive solar collector systems employing such a solar window.

The harnessing of solar energy for the efficient generation of heat and electricity is assuming increased importance in light of growing awareness of the limited nature of our fossil fuel resources. Active solar collector systems, utilizing circulating fluids as the heat transfer mechanism, and passive solar collector systems, relying on the absorption and re-radiation of solar energy by a stationary collector surface, are both well known. However, techniques for increasing the efficiency and effectiveness of such systems are being sought. The window device of the present invention provides an improved technique for more effectively controlling the transmission of incident solar radiation to the collector surfaces of such systems.

The solar heating device described in U.S. Pat. No. 3,884,414, issued May 20, 1975, utilizes a plurality of pivotable louver panels. One of the louver panels is provided with exterior and interior pressure cannisters which are interconnected to control both the opening and closing of the panels. An expansible fluid such as freon is provided in the cannisters. When the exterior cannister is exposed to direct sunlight such that the temperature of the exterior cannister is greater than that of the interior cannister, the relative vapor pressure of the freon in the exterior cannister increases, thereby forcing freon from the exterior cannister to the interior cannister until the vapor pressures are stabilized. As a result, the weight of the exterior cannister decreases and the weight of the interior cannister increases, causing the control panel and slave panels connected thereto to open. An opposite series of events takes place when the internal temperature of the exterior cannister is less than that of the interior cannister.

This type of solar heating device seeks merely to add energy to the interior of a structure above the ambient energy level contained therein, and does not seek to maximize solar energy transfer at levels of transmission lower than the ambient of the structure's interior. Furthermore, the applicability of such a device is limited to areas specifically designed to absorb massive energy transmissions. Also, this prior art device does not provide automatic protection against overheating, and will permit a constantly changing level of solar insolation to enter the building, i.e. it is unregulated.

U.S. Pat. No. 3,860,055, issued Jan. 14, 1975, discloses a shutter device for raising, lowering and adjusting the inclination of conventional window shutters. This device has a transducer element containing an expansible material, such as a gas at a slight overpressure, which activates a piston-cylinder unit for operating a camlever arrangement. The cam-lever arrangement cooperates with a mechanism for adjusting the inclination of the shutters.

One problem inherent in this type of device is that it is unresponsive to the amount of solar radiation actually passing through the shutters. This follows from the fact that the transducer element is situated between the window glass and the shutters. Another disadvantage is that the transducer element of this device will measure the same level of solar energy at different sun heights. Thus, total internal reflection of the window surface will not be accounted for by this prior art device. Additionally, such a device is not designed for absolute regulation of solar radiation transmission, since the transducer element is not insulated from the interior energy level.

This device, as with the device disclosed in U.S. Pat. No. 3,884,414, is designed for operation at a single ambient temperature (as for example in climate-controlled buildings), and is not readily adjustable over a range of temperatures.

SUMMARY OF THE INVENTION

The present invention overcomes the problems and disadvantages of the prior art devices by providing a high-efficiency solar window device having an adjustable, independently powered, automatic regulating system for controlling the amount of solar radiation transmitted through the window. The window device of the present invention is suitable for use in conjunction with both active and passive solar collectors.

Accordingly, it is a primary object of the present invention to provide novel and improved solar window apparatus for maximizing the usable solar energy transmitted through the window and minimizing the heat loss therethrough.

It is a further object of the present invention to provide a solar window device having a novel and improved automatic regulation system for controlling the amount of incident solar radiation transmitted through the window, as well as the amount of heat energy lost through the window. It is another object of the present invention to provide a solar window device which is readily adjustable over a range of temperatures.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the objects, and in accordance with the purpose of the invention, as embodied and broadly described herein, the invention comprises a window device for controlling the transmission of solar radiation therethrough, having a first diffuser means forming the exterior of the device for diffusing incoming solar radiation, a second diffuser means spaced interiorly from the first diffuser means for further diffusing the incoming solar radiation, a plurality of substantially planar vanes situated between the first and second diffuser means, with each of the vanes having reflective surfaces and being pivotable about an axis passing through its center of gravity, the vanes being interconnected to move substantially in unison, means for automatically controlling the inclination of the vanes about their respective axes in response to the amount of solar radiation transmitted past the vanes, a plurality of substantially planar insulating panels spaced interiorly from the second diffuser means, with each of the panels being pivotable about an axis passing through its center of gravity and being interconnected to move substantially in unison, and means for automatically controlling the inclination of the panels about their respective axes in response to the amount of solar radiation transmitted past the vanes, whereby the amount of solar radiation transmitted through the window is controlled.

Preferably the means for controlling the inclination of the vanes includes first sensor means situated between the first and second diffuser means for sensing a portion of the solar radiation transmitted past the vanes, and first actuator means operatively coupled to the output of the first sensor means and to the vanes, for pivoting the vanes in response to the output of the first sensor means.

Further, the means for controlling the inclination of the insulating panels preferably includes second sensor means situated between the first and second diffuser means for sensing a portion of the solar radiation transmitted past the vanes, and second actuator means operatively coupled to the output of the second sensor means and to the panels for pivoting the panels in response to the output of the second sensor means.

In another embodiment of the present invention the window device comprises a first diffuser means forming the exterior of the device for diffusing incoming solar radiation, a second diffuser means spaced interiorly from the first diffuser means for further diffusing incoming solar radiation, a plurality of substantially planar vanes situated between the first and second diffuser means, with each of the vanes having reflective surfaces and being pivotable about an axis passing through its center of gravity, the vanes being interconnected to move substantially in unison, and means for automatically controlling the inclination of the vanes about their respective axes in response to the amount of solar radiation transmitted past the vanes, whereby the transmission of solar radiation through the window is controlled.

To further achieve the foregoing objects and advantages in accordance with the present invention, there is provided solar collector apparatus, comprising a window device as described above, in combination with a passive solar collector surface situated interiorly of the window device for collecting and re-radiating solar energy transmitted through the window device.

In another embodiment of the present invention there is provided an active solar collector apparatus comprising a window device, as described above, in combination with a collector chamber situated interiorly of the window and having a heat transfer medium (e.g. air or water) circulating therethrough, whereby incident solar radiation may be converted to heat energy of the heat transfer medium. In a preferred embodiment of the present invention the collector chamber is sandwiched between the second diffuser means and the insulating panels, whereby incident solar radiation may be converted to the heat energy of the heat transfer medium, and whereby the collector chamber is insulated from the surrounding environment when the panels are in a closed position.

The accompanying drawings, which are incorporated in and constitute a part of this specification, illustrate various embodiments of the present invention, and, together with the description, serve to explain the principles of the invention.

BRIEF DESCRIPTION OF THE DRAWINGS

FIG. 3 is a sectional view of a preferred embodiment of the invention taken along line 3—3 of FIG. 1;

FIG. 4 is a fragmentary, sectional view of the preferred embodiment of the invention shown in FIG. 3, showing the vanes in a fully closed position and the insulating panels in a partially open position;

FIG. 5 is a fragmentary, sectional view of the preferred embodiment of the invention shown in FIG. 3, showing the vanes in a partially closed position and the insulating panels in a fully open position;

FIG. 6 is a fragmentary, exploded view, in section, of a portion of the embodiment of the present invention illustrated in FIG. 3, showing the sealed piston and cam means used to control the inclination of the vanes and the insulating panels;

FIG. 7 is a fragmentary, exploded view, in section, of a portion of the embodiment of the present invention illustrated in FIG. 3, showing the positioning of the sealed piston and cam mechanisms during the closing of the vanes and the insulating panels;

FIG. 8 is a schematic illustration of an ambient temperature compensator constructed in accordance with a preferred embodiment of the present invention;

FIG. 9 is a schematic top view of another preferred embodiment of the present invention in partial cut-away form to reveal details of its construction;

FIG. 10 is a sectional view of the preferred embodiment shown in FIG. 9, taken along line 10—10 of FIG. 9;

FIG. 11 is a sectional view of the preferred embodiment of the invention shown in FIG. 9, taken along line 11—11 of FIG. 9;

FIG. 12 is a perspective illustration of a surface scrubbing means suitable for use in the present invention.

FIG. 13 is a schematic diagram showing the interrelationship of the elements of the invention.

DESCRIPTION OF THE PREFERRED EMBODIMENTS

Reference will now be made in detail to the presently preferred embodiments of the invention, examples of which are illustrated in the accompanying drawings.

A preferred embodiment of the window device of the present invention for controlling the transmission of solar radiation is shown in FIGS. 1-7, and is represented generally by the numeral 10. As best shown in FIG. 3, this window device includes a first diffuser means 12 forming the exterior of the device, for diffusing incident solar radiation, and a second diffuser means 14 spaced interiorly from first diffuser means 12 for further diffusing the solar radiation. As embodied herein, these diffuser means comprise transluscent panels which are preferably comprised of a fiberglass reinforced polyester material, such as, for example, Kalwall Sunlite Premium II. Alternatively, the diffuser means may comprise transparent panels having a layer of conventional glazing material thereon.

Figure 1:
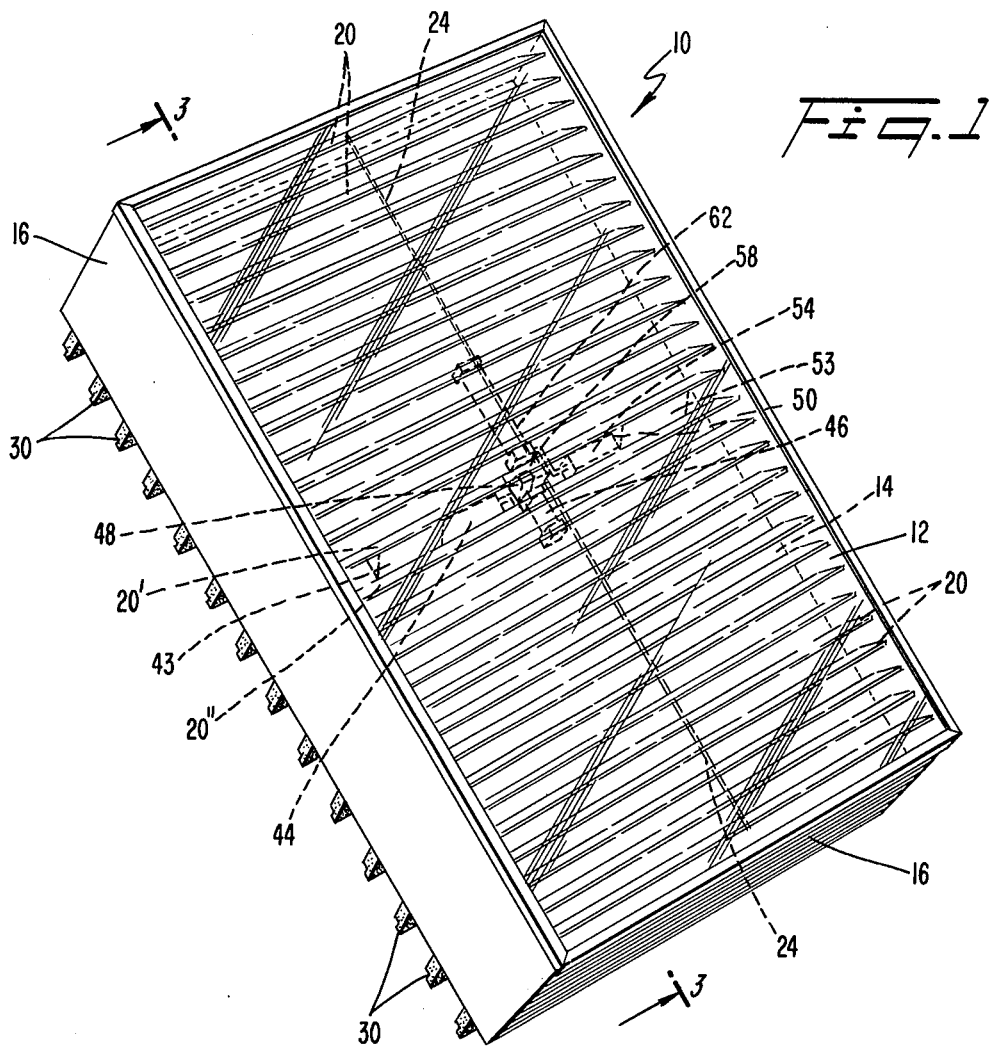
FIg. 1 is a perspective, schematic illustration of a window device constructed in accordance with a preferred embodiment of the present invention.

Diffuser means 12 and 14 may be mounted in a surrounding support frame 16. Frame 16 may comprise an integral portion of the structure to which the window device is to be mounted, such as, for example, the roofing support joists of a building, or may comprise a separate, independently mountable unit as shown in FIG. 1. Diffuser means 12 and 16, in combination with frame 16, preferably form a dead air space.

The primary purpose of diffuser means 12 and 16 is to evenly distribute the incident solar radiation so that, for example, no shadows are formed in the corners of the device. Further, as will be discussed below, the closing of the reflective vanes 20 serves to concentrate the solar radiation which is incident upon second diffuser means 14 into ever narrowing bands of increasing intensity. In passing through second diffuser means 14, the solar radiation is redistributed more evenly.

A plurality of substantially planar, relective vanes 20 are situated between first and second diffuser means 12, 14, substantially as shown in FIGS. 1 and 3. Reflective vanes 20 may be mounted on frame 16 using conventional jalousie-type hardware (not shown). Each of the reflective vanes 20 is pivotable about an axis 22 passing through its center of gravity, and the vanes are interconnected by means of a connecting rod 24 and jalousie-type hardware 26 so as to move substantially in unison. Vanes 20 may be constructed from any rigid material. The material itself may be reflective, or it may be coated with a suitablle reflective material. The surfaces of vanes 20 are preferably comprised of a mirror-finished metal or a reflective metal such as aluminum. Two vanes, 20' and 20", are preferably made of particularly rigid construction to serve as master vanes which shade the sensors utilized in controlling the inclination of vanes 20, to be discussed below in detail.

A plurality of substantially planar insulating panels 30 are also mounted on frame 16 using conventional jalousie-type hardware (not shown). In the embodiment illustrated, panels 30 are arranged substantially parallel to vanes 20. Panels 30 are spaced interiorly from second diffuser means 14, and are each pivotable about an axis 32 passing through its center of gravity. Panels 30 are interconnected by connecting rod 34 and jalousie-type hardware 36 so as to move substantially in unison. Insulating panels 30 may be constructed from any conventional heat-insulating material.

Means are provided for automatically controlling the inclination of reflective vanes 20 about their respective axes in response to the amount of solar radiation transmitted past vanes 20. As embodied herein, this automatic control means includes a sensor means situated between diffuser means 12 and 14 for sensing a portion of the solar radiation transmitted past reflective vanes 20, and an actuator means operatively coupled to the output of sensor means and to reflective vanes 20 for pivoting the vanes in response to the output of the sensor means. As embodied herein, the sensor means comprises a reservoir 40 which contains an expansible fluid. Reservoir 40 may be of any convenient shape, provided it will fit within the space designated as 42 in FIG. 3, so as not to restrain the movement of reflective vanes 20. Thus, instead of the cylinder shown in FIG. 3, reservoir 40 might be substantially triangular-shapd so as to be coextensive with space 42.

The expansible fluid contained within reservoir 40 will preferably comprise a volatile fluid such as freon, or another similar fluid. Typically the fluid may be a gas at a slight overpressure, a liquid with a comparatively high coefficient of expansion, namely a liquid hydrocarbon, or a liquid which, when heated, can be transformed into the vapor phase.

The surface of reservoir 40 and/or optional surface 43 is preferably made highly heat-absorbing. This may be accomplished, for example, by applying a black or other heat-absorbing coating to such surfaces.

It can readily be seen that incident solar radiation will serve to heat the expansible fluid in reservoir 40 thereby causing it to expand. This expansion of the fluid constitutes the output of the sensor means.

As herein embodied, the actuator means includes a conventional pressure regulator 44 which is connected to reservoir 40 so that the pressure generated by the expansible gas in reservoir 40 comprises the input to pressure regulator 44. Pressure regulator 44 operates in a conventional manner to provide a reduced, controlled pressure output which is proportional to the input pressure. The output pressure provided by pressure regulator 44 acts on sealed piston 46, which is, in turn, connected to one of the master vanes 20' via a slotted cam 48. Thus, it can be seen that the increased pressure of the expansible fluid, resulting from its heating under the influence of the incident solar radiation, will act, via pressure regulator 44, sealed piston 46, and slotted cam 48, to generate movement of master vane 20', and all of the other vanes 20 which are connected thereto.

FIGS. 6 and 7 illustrate the two possible extreme positions of reflective vanes 20, sealed piston 46 and slotted cam 48. In FIG. 6 reflective vanes 20 are shown in a fully open position with essentially no incident solar radiation being blocked by the vanes, while FIG. 7 shows reflective vanes 20 in their fully closed position in which essentially all the incident solar radiation is reflected away from the window. The arrows in FIG. 7 illustrate the respective directions of movement of the reflective vanes 20, slotted cam 48 and sealed piston 46 in moving from the fully open to the fully closed position.

In accordance with the invention, ambient temperature compensation means are preferably provided to compensate for changes in ambient temperature which might otherwise adversely affect the operation of the means for automatically controlling the inclination of reflective vanes 20. For example, as the ambient temperature rises or falls above, or below certain levels, the temperature, and thus the pressure outputs, of reversoir 40 will be affected. This ambient temperature effect wil occur irrespective of the amount of solar radiation incident on the window device, and thus may result in the transmission of more or less solar radiation than desired through the window. The ambient temperature compensation means is designed to compensate for this ambient temperature effect.

As embodied herein, the ambient temperature compensation means may comprise a unit constructed as shown in FIG. 8. The compensator unit, indicated generally by the numeral 62, is preferably placed in-line between pressure regulator 44 and sealed piston 46, although other arrangements are suitable. Thus, the output from the pressure regulator is fed to compensator unit 62 via inlet 63, and the compensated pressure output exits the unit via outlet 64, and is fed to the piston 46. Compensator unit 62 includes a closed cylinder 65 having pistons 66a, 66b and 66c fixed on rod 66, with pistons 66b and 66c being situated on opposite sides of fixed partition 67. Heat exchanger chambers 68 containing an expansible gas such as, for example, freon are provided in unit 62. Capillary tube sensors 69 sense the ambient temperature level and provide heat input to heat exchanger chambers 68 in response thereto. The output of heat exchanger chambers 68 is connected to cylinder 65 as shown, to provide a compensating force on piston 66b. Thus, piston 66c, which acts to provide the output pressure from compensator unit 62 is controlled by the input from the pressure regulator, as applied to piston 66a, and by the compensating input from heat exchanger chambers 68, as applied to piston 66b.

The respective piston travel distances and respective cylinder chamber volumes are in fixed ratio at specific temperature and initial stage pressure and are selected so that the degree of compensation is appropriate for the desired application.

Preferably, the means for controlling the inclination of reflective vanes 20, discussed above, further includes means for applying a force to reflective vanes 20 biasing them toward their open position, in which substantially all the incident solar radiation is transmitted through the window. Further, the actuator means, described above, is preferably designed to ovecome this biasing force at a pre-selected level of solar radiation transmission, and react over a predetermined differential range. As embodied herein, the biasing means comprises a compression spring 49 situated within sealed piston 46 so as to bias the piston toward the position it assumes when reflective vanes 20 are in their fully open position. The pre-selected level of transmission is adjustable over a range of values by adjusting the setting of the threshold of pressure regulator 44, as wil be discussed below.

Means are also provided for automatically controlling the inclination of insulating panels 30 about their respective axes in response to the amount of solar radiation transmitted past reflective vanes 20. As embodied herein, this automatic control means is substantially identical to the means for controlling the inclination of reflective vanes 20, as fully described above.

Specifically, the means for controlling the inclination of insulating panels 30 includes a reservoir 50 situated between first and second diffuser means 12 and 14, and containing an expansible fluid (with reservoir 50 preferably having a radiation-absorbing surface 53), a pressure regulator 54 connected to reservoir 50 (with regulator 54 preferably including means for remote adjustment), and a sealed piston 56 connected to the output of pressure regulator 54, and having its output connected to master panel 30' via slotted cam 58. Each of the above-recited elements functions in substantially the identical manner to the corresponding elements of the above-described means for controlling the inclination of reflective vanes 20.

Preferably, the means for controlling the inclination of insulating panels 30 further includes means for applying a force to insulating panels 30 biasing them toward their closed position, in which substantially no solar radiation is transmitted through the window. As embodied herein, the biasing means comprises a compression spring 59 situated within sealed piston 56 so as to bias the piston toward the position it assumes when insulating panels 30 are in their fully closed position. Pressure regulator 54, sealed piston 56 and slotted cam 58, which together function as an actuator means, are designed to overcome this biasing force at a pre-selected level of solar radiation transmission. The pre-selected level of transmission is adjustable over a range of values by adjusting the setting of the threshold of pressure regulator 54, as will be discussed below.

The respective means for automatically controlling the inclination of reflective vanes 20 and insulating panels 30 are preferably mounted in the respective positions shown in FIGS. 1 and 3, using support braces (not shown) mounted on frame 16. Reservoirs 40, 50, pressure regulators 44, 54, sealed pistons 46, 56, and slotted ams 48, 58, are selected, constructed and arranged to function such that, in operation, reflective vanes 20 and insulating panels 30 are automatically rotated about their respective axes to control the amount of solar radiation transmitted through the window.

During periods when little or no solar radiation is incident upon the window device of the present invention, reflective vanes 20 are preferably biased toward their fully open position, as described above, and insulating panels 30 are preferably biased toward their fully closed position, as described above. As the level of incident solar radiation increases, as for example in the early morning hours, the incident solar radiation will serve to heat the expansible fluid contained in reservoirs 40 and 50, thereby increasing the fluid pressure. As noted above, this increasing pressure will be applied to pressure regulators 44 and 54, respectively, in a conventional manner.

Pressure regulators 44 and 54 are preferably of the type which can be manually, and preferably remotely, adjusted to provide a pressure output only when the pressure input from reservoirs 40, 50, respectively, reaches a pre-selected threshold value. The threshold value is infinitely adjustable over the designed range via, for example, flexible cables (not shown) connected to a conventional control dial, etc. (not shown). When the pressure arriving at the respective pressure regulators 44 and 54 reaches the pre-set, threshold pressure, the regulators provide a controlled, reduced output pressure to the respective sealed pistons 46 and 56. The value at which the threshold is set is where the differential, i.e. the energy required to fully open or fully close vanes 20 and panels 30, begins. That is, if vanes 20 are designed, for example, to fully close over a range of 25 BTU's/HR.ft.$^2$, then the threshold value plus 25 BTU's/HR.ft.$^2$ will be the peak energy maximum transmitted through the window. Again, assuming, for example a differential of 25 BTU's/HR.ft.$^2$, vanes 20 will close halfway at a level of 12.5 BTU's/HR.ft.$^2$. Further, assuming, for example, that the desired peak level of transmission through the window is 150 BTU's/HR.ft.$^2$, then when the level of incident radiation reaches twice that value, reflective vanes 20 will be automatically inclined such that roughly fifty percent of the incident radiation is reflected and roughly fifty percent, i.e. 150 BTU's/HR.ft.$^2$ (including the 12.5 BTU's/HR.ft.$^2$ required to close reflective vanes 20 halfway) is transmitted through the window. This is the dynamic equilibrium.

The threshold pressure for regulator 54 will pre-set at a lower value than the threshold pressure for regulator 44. Thus, regulator 54 will initiate movement of sealed piston 56 before reflective vanes 20 begin to close. When the pressure applied by the regulator 54 to sealed piston 56 reaches a level sufficient to fully overcome the compression force of spring 59, insulating panels 30 will be rotated to their fully open position.

As the level of incident solar radiation further increases, the pressure generated by the expansible fluid contained in reservoir 40 continues to increase until it reaches the higher threshold value selected for pressure regulator 44, so that regulator 44 then initiates movement of sealed piston 46. The output pressure applied by regulator 44 acts to overcome the biasing force exerted by compression spring 49, causing reflective vanes 20 to rotate, thereby blocking a portion of the incident solar radiation from passing through the window, as shown in FIG. 5. It will be appreciated that the partial closing of master vanes 20' and 20 " will serve to shade a portion of reservoir 40, thus tending to cool the reservoir and the expansible fluid contained therein. The cooling of the expansible fluid will reduce the pressure applied to pressure regulator 44, which in turn will reduce the pressure applied to sealed piston 46, thereby causing vanes 20 to rotate toward a more open position.

It can readily be seen that an equilibrium condition will be reached which will be a function of the particular characteristics of the expansible fluid, the compression spring and the pressure regulator, and the particular threshold pressure at which the regulator is manually pre-set. This equilibrium condition will result in an essentially constant level of solar radiation being transmitted through the window.

When the level of incident solar radiation diminishes to a very low level, such as, for example after sunset, the pressure of the expansible fluid contained in reservoir 54 will fall below the pre-set threshold value of pressure regulator 54, so that the regulator will provide little or no output pressure. In this condition, spring 59 will act on sealed piston 56 to move slotted cam 58 and insulating panels 30 to the fully closed position, thereby effectively precluding heat loss through the window device.

As reflective vanes 20 close to maintain the preselected constant level of solar radiation transmission, the solar radiation will be concentrated in ever-narrowing bands striking diffuser means 14. Thus, one of the primary purposes of diffuser means 14 is to diffuse these bands so as to more evenly distribute the solar radiation leaving the window device.

It will be appreciated that the means for controlling the inclination of reflective vanes 20, as described above, can be set to transmit the desired amount of solar radiation, and to peak at the desired maximum level of transmission, inclusive of the energy required to open or close the vanes as necessary to maintain the desired equilibrium.

The operational cycle of the window device of the present invention may be generally described as follows. Beginning at sunrise, the incident solar radiation penetrates first diffuser means 12, becoming more evenly distributed to reflective vanes 20. As the solar energy transmission level increases to a manually pre-selected level, insulating panels 30 open. The system is adjusted so that insulating panels 30 open fully before the level of solar radiation transmission approaches that required to initiate closing of reflective vanes 20. When the level of solar energy transmission past reflective vanes 20 reaches the desired level, i.e. the manually pre-selected transmission constant, reflective vanes 20 begin to close, partially reflecting solar radiation away from the window device, while transmitting the desired amount of solar radiation (including the energy required to further close and open the vanes). The closing and opening of reflective vanes 20 is achieved automatically as the level of incident solar radiation changes, through the use of the inclination control means described above. After sunset, reflective vanes 20 return to their fully open position and insulating panels 30 return to their fully closed position, to substantially prevent heat loss through the window device.

Figure 2:
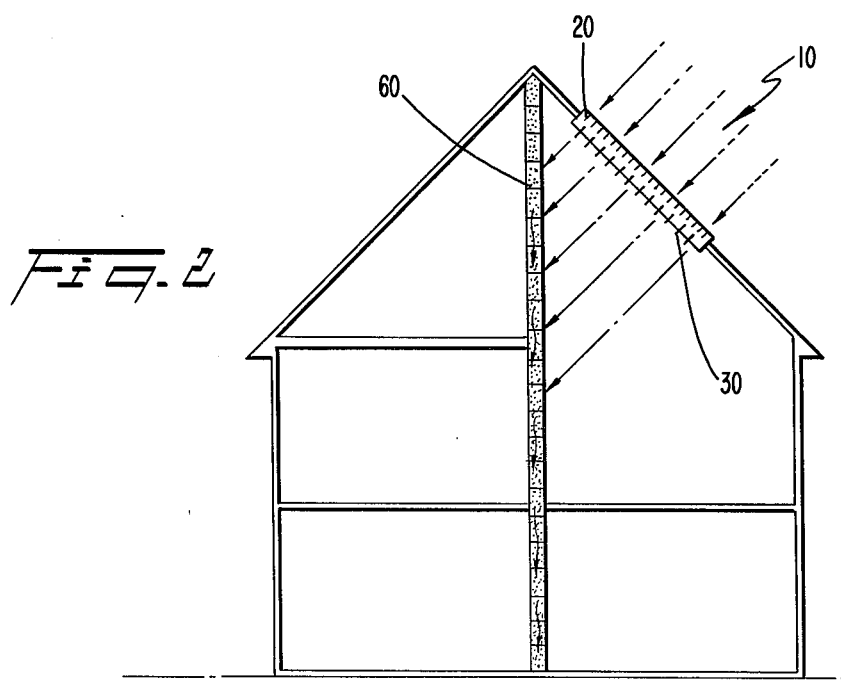
FIG. 2 is a schematic illustration of a passive solar collector system for heating a building constructed in accordance with the present invention.

As shown in FIG. 2, the improved window device of the present invention is suitable for use in conjunction with conventional passive solar collector systems. As shown in FIG. 2, the window device of the present invention may be utilized to control the transmission of solar radiation to a passive collector surface 60. Such a collector surface may typically comprise a solid wall structure formed from a material which will readily absorb and re-radiate heat energy. Typical examples of such materials are cement block, concrete or brick. As further shown in FIG. 2, adjustable position stops (not shown) may be provided to control the position of the insulating panels 30 in their fully open position, thus controlling the angle of incidence of the solar radiation transmitted by the window device on collector surface 60. Such position stops may be located, for example, on sealed piston assembly 56 or connecting rods 34.

In accordance with another preferred embodiment of the invention, insulating panels 30 may be eliminated from the window device. Of course, the elimination of insulating panels 30 is desirable only in those uses of the invention where heat loss through the window does not present a significant problem. An example of such a use would be to control the transmission of solar radiation into a greenhouse. Insulating panels 30 may also be eliminated when using the window device of the present invention in combination with an active solar collector system.

In another preferred embodiment, the window device of the present invention comprises an integral part of an active solar collector system employing water, air, or another suitable heat transfer medium. As best shown in FIGS. 9, 10 and 11, an active solar collector apparatus incorporating the window device of the present invention will preferably be constructed so that the collector chamber is sandwiched between second diffuser means 14 and insulating panels 30. However, in appropriate circumstances, panels 30 may be eliminated. The window is mounted on frame 71.

In the active solar collector system shown in FIGS. 9, 10 and 11, the heat transfer medium, preferably air, is circulated through the collector chamber 70 using conventional fan means (not shown). In this embodiment, solar radiation transmitted past reflective vanes 20 heats the circulating air. The heated air is used, for example, to heat the interior of a building. Preferably, the heated air will be circulated from the collector chamber to a conventional thermal storage area such as, for example, a rock bed where heat energy may be stored for subsequent use.

In a preferred embodiment of the invention, the base of collector chamber 70 will be constructed so as to act as a passive heat radiator to heat the proximate ambient atmosphere.

FIG. 12 shows a preferred design for the interior of collector chamber 70. As can be seen in FIG. 12, perpendicularly situated baffles 80 and 82 are arranged at varying heights to criss-cross the interior of the collector chamber. As a result of the circulating air following the tortuous path indicated by the arrows in FIG. 12, considerable air turbulance is created, thus producing a "surface scrubbing" effect which serves to improve the heat transfer to the circulating air.

The active solar collector system described above is preferably incorporated as an integral part of a building roof structure. The automatic control of the inclination of reflective vanes 20 in response to the amount of solar radiation transmitted past the vanes provides effective protection of the components of solar collector chamber 70 from thermal degradation without relying on venting. During the summer months, when the solar insolation is greatest, the surface of collection chamber 70 could conceivably heat to over 350° F. This would cause severe thermal degradation of the collector system components. As an additional advantage, specular and diffuse solar energy is efficiently guided to the collector chamber 70 by reflecting off reflective vanes 20.

As noted above, the collection of heat from the collector apparatus is preferably two-fold, with heat being collected in the collector chamber 70 and transferred to a rock bed store using forced air. Heat is further collected by conduction through the collector base for storage in the surrounding environment, i.e. the attic. The storage system will preferably be controlled such that the attic store of energy may be tapped to provide an additional source of thermal energy when the collector chamber 70 is no longer transferring heat (e.g., after sunset).

It will be apparent to those skilled in the art that various modification and variations can be made in the solar window device of the present invention without departing from the scope or spirit of the invention. As an example, insulating panels 30 may be situated transversely to reflective vanes 20, as shown in FIGS. 9, 10 and 11. Thus, it is intended that the present invention cover the modifications and variations of this invention, provided they come within the scope of the appended claims and their equivalents.

What is claimed is:

1. A window device for controlling the transmission of solar radiation therethrough, comprising:
   (a) a first diffuser means forming the exterior of the device for diffusing incoming solar radiation;
   (b) a second diffuser means spaced interiorly from said first diffuser means for further diffusing incoming solar radiation;
   (c) a plurality of substantially planar vanes situated between said first and second diffuser means, with each of said vanes having reflective surfaces and being pivotable about an axis passing through its center of gravity, said vanes being interconnected to move substantially in unison;
   (d) means for automatically controlling the inclination of said vanes about their respective axes in response to the amount of solar radiation transmitted past said vanes, said inclination controlling means comprising first sensor means situated between said first and second diffuser means so as to be shaded by at least one of said vanes in direct proportion to the inclination of said vane for sensing the amount of solar radiation transmitted past said vanes, and first actuator means operatively coupled to the output of said first sensor means and to said vanes for pivoting said vanes in response to the output of said first sensor means;
   (e) a plurality of substantially planar insulating panels spaced interiorly from said second diffuser means, with each of said panels being pivotable about an axis passing through its center of gravity and being interconnected to move substantially in unison; and
   (f) means for automatically controlling the inclination of said panels about their respective axes in response to the amount of solar radiation transmitted past said vanes, said means for controlling the inclination of said panels comprising second sensor means situated between said first and second diffuser means so as to be shaded by at least one of said vanes in direct proportion to the inclination of said vanes for sensing the amount of solar radiation transmitted past said vanes, and second actuator means operatively coupled to the output of said second sensor means and to said panels for pivoting said panels in response to the output of said second sensor means, whereby the amount of solar radiation transmitted through the window is controlled automatically.

2. A window device as claimed in claim 1, wherein said first and second sensor means include first and second reservoirs, respectively, containing first and second expansible fluids, respectively, whereby the thermal expansion of said fluids comprises the respective outputs of said first and second sensor means.

3. A window device as claimed in claim 2 wherein each of said first and second reservoirs has a radiation-absorbing surface.

4. A window device for controlling the transmission of solar radiation therethrough, comprising:
   (a) a first diffuser means forming the exterior of the device for diffusing incoming solar radiation;
   (b) a second diffuser means spaced interiorly from said first diffuser means for further diffusing incoming solar radiation;
   (c) a plurality of substantially planar vanes situated between said first and second diffuser means, with each of said vanes having reflective surfaces and being pivotable about an axis passing through its center of gravity, said vanes being interconnected to move substantially in unison;
   (d) means for automatically controlling the inclination of said vanes about their respective axes in response to the amount of solar radiation transmitted past said vanes, said inclination controlling means comprising first sensor means situated between said first and second diffuser means so as to be shaded by at least one of said vanes in direct proportion to the inclination of said vane for sensing the amount of solar radiation transmitted past said vanes, and first actuator means operatively coupled to the output of said first sensor means and to said vanes for pivoting said vanes in response to the output of said first sensor means;
   (e) a plurality of substantially planar insulating panels spaced interiorly from said second diffuser means, with each of said panels being pivotable about an axis passing through its center of gravity and being interconnected to move substantially in unison; and
   (f) means for automatically controlling the inclination of said panels about their respective axes in response to the amount of solar radiation transmitted past said vanes, said means for controlling the inclination of said panels comprising second sensor means situated between said first and second diffuser means so as to be shaded by at least one of said vanes in direct proportion to the inclination of said vanes for sensing the amount of solar radiation transmitted past said vanes, and second actuator means operatively coupled to the output of said second sensor means and to said panels for pivoting said panels in response to the output of said second sensor means, whereby the amount of solar radiation transmitted through the window is controlled automatically,
   wherein said first and second sensor means include first and second reservoirs, respectively, containing first and second expansible fluids, respectively, whereby the thermal expansion of said fluids comprises the respective outputs of said first and second sensor means, and
   wherein said means for controlling the inclination of said vanes further includes means for applying a force to said vanes biasing them toward an open position in which substantially all of the incident solar radiation passes through the window, said first actuator means being adapted to overcome said biasing force at a predetermined level of solar radiation transmission.

5. A window device as claimed in claim 4, wherein said means for controlling the inclination of said panels further includes means for applying a force to said panels biasing them toward a closed position in which substantially no incident solar radiation passes through the window, wherein said second actuator means is adapted to overcome said biasing force at a predetermined level of solar radiation transmission.

6. A window device as claimed in claim 5, wherein said first actuator means further includes a first pressure regulator connected to said first reservoir for providing a first regulated pressure output in response to the thermal expansion of said first fluid, and a first sealed piston having an input connected to said first regulated pressure output and an output connected to said vanes for movement thereof.

7. A window device as claimed in claim 6, wherein said first pressure regulator is adapted to provide a pressure output only when the pressure input thereto reaches a pre-selected threshold pressure.

8. A window device as claimed in claim 6, wherein said second actuator means further includes a second pressure regulator connected to said second reservoir for providing a second regulated pressure output in response to the thermal expansion of said second fluid, and a second sealed piston having an input connected to said second regulated pressure output and an output connected to said panels for movement thereof.

9. A window device as claimed in claim 6, wherein said means for biasing said vanes comprises a compression spring biasing said piston in opposition to said first regulated pressure output.

10. A window device as claimed in claim 9, wherein said means for biasing said panels comprises a compression spring biasing said piston in opposition to said second regulated pressure output.

11. A window device as claimed in claim 1, wherein said first and second diffuser means are substantially planar and said second diffuser means extends substantially parallel to said first diffuser means.

12. A window device as claimed in claim 11, wherein said first and second diffuser means comprise first and second translucent panels, respectively.

13. A window device as claimed in claim 12, wherein said first and second diffuser means are comprised of a fiberglass reinforced polyester material.

14. A window device as claimed in claim 11, wherein said first and second diffuser means comprise, respectively, first and second transparent panels having a layer of glazing material thereon.

15. A window device as claimed in claim 1, including means for substantially preventing the movement of air between said first and second diffuser means.

16. A window device as claimed in claim 1, wherein said vanes and panels are elongated and are pivotable about their respective longitudinal axes.

17. A window device as claimed in claim 11, wherein the width of said vanes is substantially equal to the spacing between said first and second diffuser means, and wherein said vanes are laterally spaced apart in a manner such that upon pivoting the vanes to a position substantially parallel with said first and second diffuser means, substantially no solar radiation is transmitted through the window.

18. A window device as claimed in claim 17, wherein said panels are of substantially equal width and are laterally spaced apart in a manner such that upon pivoting the panels to a position substantially parallel with said first and second diffuser means, substantially no solar radiation is transmitted through the window.

19. A window device as claimed in claim 1, wherein the surfaces of said vanes are comprised of a mirror-finished metal material.

20. A window device for controlling the transmission of solar radiation therethrough, comprising:
(a) a first diffuser means forming the exterior of the device for diffusing incoming solar radiation;
(b) a second diffuser means spaced interiorly from said first diffuser means for further diffusing incoming solar radiation;
(c) a plurality of substantially planar vanes pivotally situated between said first and second diffuser means, with each of said vanes having reflective surfaces, said vanes being interconnected to move substantially in unison; and
(d) means for automatically controlling the inclination of said vanes about their respective pivots in response to the amount of solar radiation transmitted past said vanes, said inclination controlling means comprising sensor means situated between said first and second diffuser means so as to be shaded by at least one of said vanes in direct proportion to the inclination of said vane for sensing the amount of solar radiation transmitted past said vanes, and first actuator means operatively coupled to the output of said sensor means and to said vanes for pivoting said vanes in response to the output of said sensor means;
wherein said sensor means includes a reservoir containing an expansible fluid, whereby the thermal expansion of said fluid comprises the output of said sensor means, and
wherein said means for controlling the inclination of said vanes further includes means for applying a force to said vanes biasing them toward an open position in which substantially all of the incident solar radiation passes through the window, said actuator means being adapted to overcome said biasing force at a predetermined level of solar radiation transmission, whereby the transmission of solar radiation through the window is controlled automatically.

21. Solar collector apparatus comprising a window device as claimed in claims 1 or 20, and a passive solar collector surface situated interiorly of said window device for collecting and re-radiating solar energy transmitted through said window device.

22. Solar collector apparatus, comprising a window device as claimed in claim 20, and a collector chamber situated interiorly of said window and having a heat transfer medium circulating therethrough, whereby incoming solar radiation may be converted to the heat energy of said heat transfer medium.

23. Solar collector apparatus, comprising a window device as claimed in claim 1, and a collector chamber sandwiched between said second diffuser means and said insulating panels and having a heat transfer medium circulating therethrough, whereby incoming solar radiation may be converted to the heat energy of said heat transfer medium and whereby said collector chamber is insulated from the surrounding environment when said panels are in a closed position.

24. Solar collector apparatus as claimed in claims 22 or 23, wherein said heat transfer medium is air.

25. Solar collector apparatus as claimed in claims 22 or 23, wherein said collector chamber includes means for providing surface scrubbing of the circulating heat transfer medium, thereby improving heat transfer to said medium.

26. Solar collector apparatus as claimed in claim 23, wherein said collector chamber includes a base which is adapted to radiate heat energy to the surrounding environment.

27. Solar collector apparatus as claimed in claim 23, further comprising means connected to said collector chamber for storing the heat energy developed in said heat transfer medium for later use.

28. Solar collector apparatus as claimed in claim 27, wherein said means for storing heat energy comprises a rock bed.

* * * * *